April 22, 1969  B. W. BRADLEY  3,439,744
SELECTIVE FORMATION PLUGGING
Filed June 23, 1967  Sheet 1 of 2

INVENTOR:
BRYANT W. BRADLEY
BY: [signature]
HIS AGENT

United States Patent Office 3,439,744
Patented Apr. 22, 1969

3,439,744
SELECTIVE FORMATION PLUGGING
Bryant W. Bradley, Houston, Tex., assignor to Shell Oil Company, New York, N.Y., a corporation of Delaware
Filed June 23, 1967, Ser. No. 648,350
Int. Cl. E21b 33/13, 43/16
U.S. Cl. 166—287                                6 Claims

ABSTRACT OF THE DISCLOSURE

A process for recovering oil from underground formations containing thief and non-productive permeable zones comprising temporarily plugging the oil-productive zone with a material readily susceptible to freezing thereby forming a frozen plug and thereafter plugging thief and non-productive permeable zones with a permanent plugging material, removing the temporary frozen plug from the oil-productive zone by suitable means such as dissolution or thawing, and recovering oil therefrom by means of a fluid drive.

---

This invention is directed to a new, novel and improved process for recovering economically and effectively oil from underground formations having heterogeneous permeability. More particularly, the present invention is directed to a process for recovering oil from such formations by temporarily sealing or plugging, with a solid or solid-like material which is readily heat dissolvable, the oil-productive zone, particularly the area around the liner of the wall borehole penetrating said zone so as to prevent the permanent plugging material subsequently injected into the thief and non-productive zones from entering the oil-productive zone and thereafter removing the temporary plugging material from the oil-productive zone, and finally injecting a fluid drive into the oil-productive zone to recover therefrom oil by either backflow or injection-production techniques.

Background of the invention

The problem of selective plugging of formations to improve oil recovery is well known in the art as evidenced by reference to U.S. Patents 2,864,448; 2,801,699; 2,787,325; 3,261,400 and 3,141,503. In general, the entire permeable zone is plugged with a uniform plugging material and thereafter the less permeable zones are treated in a suitable manner so as to render them more permeable such as by acid treatment or the like. Under these conditions it becomes a difficult and costly procedure to subsequently remove the plugging material from desired productive zones for subsequent treatment for recovery of oil therefrom.

In many situations it is common practice to drill through all oil-productive zones, cement and perforate casing so as to produce all zones simultaneously. In other cases, sand production is a problem and special liners to exclude sand are hung through the productive intervals or zones rather than to cement and perforate casing. In liner completions, it is often very difficult, if not impossible, to successfully conduct secondary recovery operations when one of the zones is more permeable than other portions of the oil sand. As a result, the displacing fluid, be it steam, gas or water, channels quickly through the thief zone or depleted permeable zones giving poor displacement in the remainder of the oil sands.

In formations with thief zones, it is generally necessary to inject a compound into the permeable section in the vicinity of the borehole to create a permanent plug. However, this is very difficult to do because communication behind the liner permits the plugging agent to flow into the oil sands where plugging is not desired. Mechanical means or use of fluids of varying viscosities and gel-set times to control the flow of plugging agents behind the liner are generally unsuccessful and in addition are costly and difficult to control and place.

It is an object of the present invention to recover oil from underground oil-bearing zones by an improved process of selectively, permanently plugging non-productive permeable zones without plugging the oil-productive zones.

Still another object of the present invention is to permanently plug thief zones without having the plugging material coming in contact with or flowing into the oil recovery zones.

Still another object of the present invention is to temporarily plug the oil-productive zones with a heat dissolvable plugging material and thereafter permanently plugging the thief zones and non-productive permeable zones of the formation.

Still another object of the present invention is to recover oil from oil-productive zones of a formation using fluid drives by first temporarily plugging the oil-productive zones with a material subject to dissolution by heat, permanently plugging the thief zones and non-productive permeable zones and thereafter removing the temporary plug by dissolution and/or thawing and finally recovering oil therefrom by use of a fluid drive injected into said oil-productive zones through an injection well by use of backflow or through a production well.

Summary of the invention

Briefly stated, the process of the present invention comprises improving oil recovery by preventing flow of plugging agents destined for plugging thief zones or depleted or non-productive permeable zones of an earth formation, from entering the oil-productive zones of the formation, by first temporarily freezing said oil-productive zones with suitable freezing materials injected into said zones thereby forming a temporary plug which prevents the subsequent injected permanent plugging agents from entering the oil-productive zones and allows the permanent plugging agents to enter into only the thief or non-productive zones. The thief and non-productive zones can be permanently plugged with suitable plugging materials such as polymeric resins or other types of suitable materials as described in U.S. Patents 3,308,884; 3,261,400; 3,251,414; 2,864,448; 2,801,669 or the like. The temporary frozen plug is removed by suitable means such as by chemical action or heating to render said oil-productive zone susceptible to oil recovery treatment without loss of driving fluids into the plugged thief zones or other areas of the formation.

To accomplish the essence of the process of the present invention the essential steps comprise:

Disposing a low-freezing-point fluid, water or heavy oil in a well borehole adjacent to a permeable earth formation which is not to be permanently plugged but is located behind a permeable conduit that extends along a selected permeable earth formation that is to be plugged;

Removing heat from the low-freezing-point liquid, water or heavy oil and the adjacent earth formation until the earth formation is temporarily plugged by the freezing of fluid that was contained within its pores;

Continuing the removing of heat until the earth formation to be permanently plugged becomes substantially the only permeable earth formation that is located behind the permeable conduit and is not plugged by the freezing of fluids;

Plugging the earth formation to be permanently plugged by injecting fluid and converting it to plugging material;

Unplugging the temporarily plugged earth formation by melting the material that was frozen within its pores; and, Recovering oil therefrom.

The process of this invention can be modified as follows:

Spotting solidifiable liquid in and along all layers of the formation;

Spotting freezing coils above and/or below the thief zone and freezing plugs that isolate said zone;

Injecting a permanent plugging agent into the thief zone;

Thawing to remove the freezing coils; and,

Thereafter proceeding as above to recover oil.

The control of the size of the frozen plug and time for freezing can be calculated and controlled in suitable means.

Brief description of the drawings

The method of this invention is further illustrated by reference to the drawings in which corresponding parts in each of said drawings are referred by like numerals.

In FIGURES 2, 3 and 4 the temporary plugging frozen zones are shown by areas 21, 22 and 23 which illustrate the freezing solution area, ice and solidified formation normally consisting of a frozen solution and congealed oil, respectively. The permanently plugged area 24 is thus plugged by injection of suitable plugging materials through casing 14 (FIGURE 2) or through tubing string 20 (FIGURES 3 and 4). Packings 25, shown in FIGURES 3 and 4, are located in suitable sections of the zone to be permanently plugged and prevent the plugging material from entering an oil zone.

Description of the preferred embodiment of the invention

Figure 1:
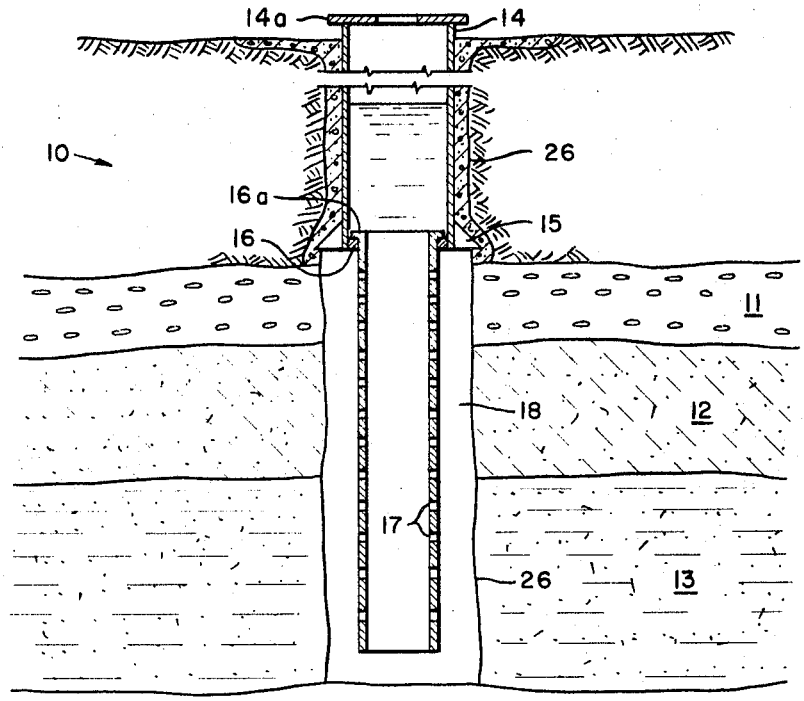
FIGURE 1 illustrates the general problem encountered when a well borehole penetrates a formation 10 containing a highly permeable oil zone which has been swept of oil by displacing fluids, such as gas, steam, water or solvents, in a secondary recovery operation and is now a thief zone 11, an impermeable zone such as a shale zone 12 and an oil sand zone 13 from which the oil is recovered. The well construction is of the conventional type having a casing 14, having a flange 14a, casing shoe 15 and hanger 16 to which is attached liner 16a having perforations 17 and a borehole area 18.

As stated, it has been found that by the process of this invention the flow of permanent plugging agents into the oil sand can be prevented by first freezing the oil sand zone by suitable freezing means thereby temporarily plugging it. The process can be explained by referring to FIGURE 1. In this case, a thief zone 11 overlies a shale stringer 12 which in turn overlies an oil sand 13. The thief zone 11 may have been originally any oil-bearing zone, but which has been flooded out by a secondary recovery operation, and therefore must be plugged to prevent such a zone from taking an unreasonable amount of water, gas, solvents or steam when such fluids are used as the fluid drive in oil recovery. In such cases, it is necessary to protect the oil sand from damage while the plugging agent is pumped into the thief zone 11 surrounding the injection well borehole 26. FIGURE 1 shows the well to be standing with water at a level equal to the hydrostatic pressure existing in the well. The method of protecting the oil zone consists of solidifying the fluids within and behind the liner 16a and in the formation around the borehole through the oil sand interval and up into the shale stringer. If the oil sand is several hundred feet thick it may be necessary to only freeze the top section, say 10 feet, to isolate and prevent fluid flow to the oil zone.

Figure 2:
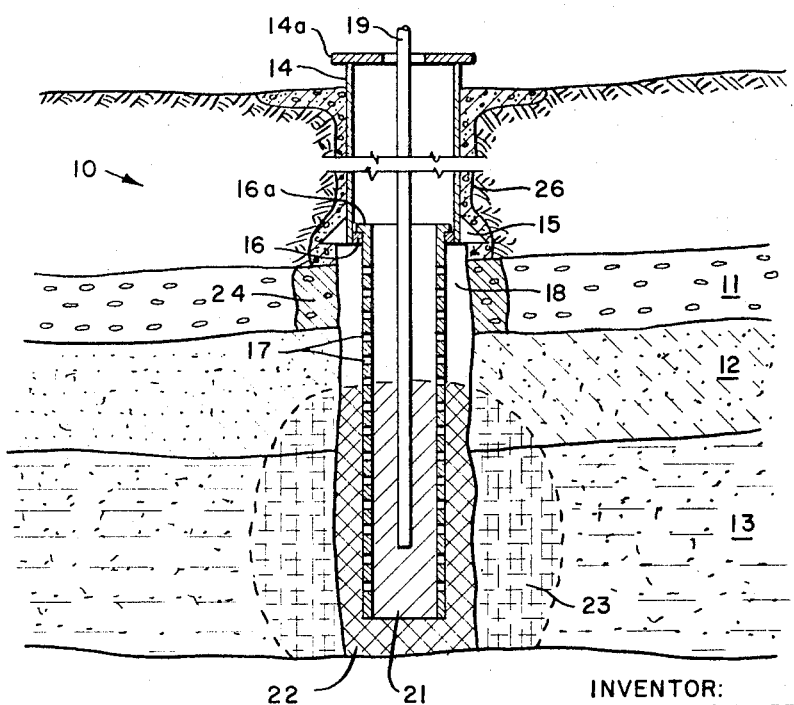
FIGURES 2, 3 and 4 illustrate the result of formation treatment by the process of the present invention wherein the tubing string 19 penetrates into the oil sand productive zone(s) through which the materials for temporarily freezing said zones are injected into said formation and tubing string 20 in FIGURES 3 and 4 is for use of injecting permanent plugging materials such as polymeric resins as described in U.S. Patent 3,308,884 for permanently plugging thief zones and other nonproductive zones.

FIGURE 2 illustrates the condition which exists after the solid plug is formed and is designated by areas 21, 22 and 23. The freezing agent can consist of a non-aqueous cooling bath, such as a mixture of carbon dioxide snow with alcohol, chloroform or ether. For this purpose, it is desirable to use a carbon dioxide in the form of Dry Ice which has a size large enough so that it would not pass through the holes in the liner. The frozen plug surrounding the liner 16a and extending back into the formation would consist of ice 22 and/or congealed oil 23 if any remained after the initial secondary recovery operations. The freezing solution can also consist of a slurry of granular carbon dioxide and one of the various substances listed above. It is preferable for the slurry to be made up with a low-freezing-point hydrocarbon with a specific gravity heavier than water. Thus, the freezing solution can be spotted in the bottom of the well to solidify the fluid around the liner without gravity displacement by water. Typical compounds are 50—50 (w.) glycerine-water mixture (specific gravity 1.130), which freezes at −22° C., or 50—50 (w.) ethylene glycol-water mixture (specific gravity 1.067), which freezes at −33° C. Any other suitable polyhydric alcoholic-water mixtures or low-freezing-point fluids can be used.

The freezing operation can be done in still other ways. For example, a low-freezing-point brine solution, e.g., a 23 percent by weight of NaCl, which has a freezing point of −20° C., can be spotted in the liner and chilled with entrained granular carbon dioxide. Also, any suitable earth freezing technique adaptable to be well bore construction and process of this invention can be used and may include refrigeration techniques for freezing underground formations as described in U.S. Patents 3,287,-915; 2,932,170 or British Patent 732,209.

After the ice-congealed oil plug 21–23 is formed to protect the oil sands, the permanent plugging agent is pumped into the thief zone 11. After the permanent plug has set and designated by area 24, the ice is melted and the oil viscosity returned to normal by heat from the surrounding formation rock. A driving fluid such as gas, solvent, steam and/or water is injected into the oil sand in order to recover oil.

Figure 3:
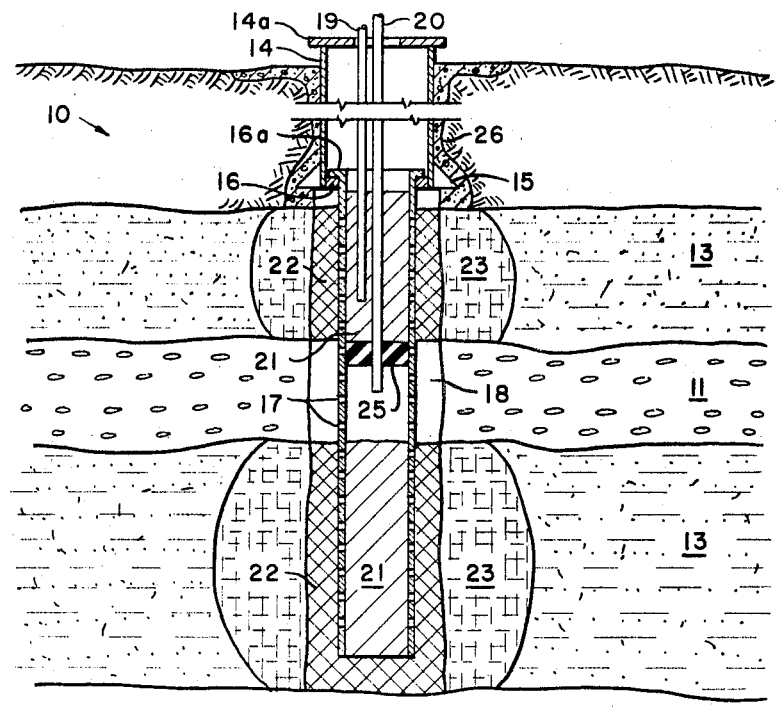

FIGURE 3 illustrates the arrangement where the thief zone is midway in a thick oil sand. In this case, the freezing solution is injected or the freezing oil is located to spot one ice plug over the lower oil sand. A string of tubing 20 with a packer 25 is set right at the top of the thief zone or the bottom of the top oil sand and a second freezing solution injected through another tubing string 19 or a second freezing coil spotted just above the packer. The top or second freezing solution should have a specific gravity less than water so it will now flow downward behind the liner displacing water opposite the thief zone. (If a mechanical freezing coil is used, no special freezing solution is required.) After the frozen plug is formed to protect the top oil sand, the permanent plugging agent is pumped down the packed-off tubing into the thief zone 11. Tubing 20 must be filled with an anti-freeze solution while the upper frozen plug is being formed.

Figure 4:
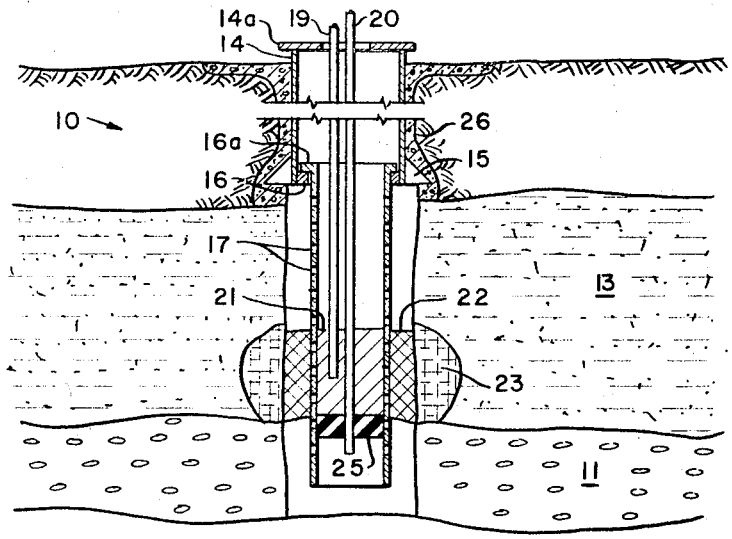

In the case of a thief zone lying at the bottom of a massive sand interval, the oil sand can be protected by an ice plug as shown in FIGURE 4. A string of tubing 20 is run on a packer 25 set at the top of the thief zone 11. A second tubing string 19 is used to inject a freezing solution in the liner 11 through perforations 17 forming the ice plug in the annulus 18 around the liner 16 just above the thief zone. A freezing solution with a gravity less than water is necessary in this case. In this case, it is normally not necessary to freeze the annular space over the whole oil zone. All that is necessary is a solid plug for 10 to 15 feet above the thief zone so that no fluid can flow upward behind the liner as the permanent plugging agent is pumped down the packed-off tubing into the thief zone surrounding the borehole. In this case, it may be desirable to even fill the hole with the plugging agent after the thief zone has been plugged to the desired radius. Freezing may also be done by a mechanical refrigerate cooling coil. In that case no special freezing solution is required.

A preferred method of permanently plugging thief zones after the oil-productive zone has been temporarily plugged by freezing comprises the use of epoxy resins and consists in following the steps of (a) preparing a solution of a resin-forming epoxide having more than one vicinal epoxy group per molecule and an amine capable of acting as curing agent for said epoxide, and, optionally, a cure rate controlling compound, the resin-forming ingredients being present in a combined concentration of at least 20 percent by volume of said solution, and being selected to provide a system which remains a homogeneous solution of relatively low viscosity for a substantial period of time, sufficient to inject said solution into said formation, (b) injecting the solution into the pore space of a permeable formation to be treated, and (c) retaining the solution in the formation for a sufficient time to permit the solution to be converted to a gel which completely fills the pore space of the mass and to cure to a coherent, cross-linked resin mass.

The composition of the solution is selected such that the (a) resin-forming ingredients and partial reaction products remain dissolved until the solution has entered the formation to be plugged and thereafter react to form a gel which incorporates the solvent, and (b) the solution has a viscosity which is sufficiently low to permit it to be pumped into the formation in a reasonable length of time with available equipment.

The viscosity is usually selected to be below 100 centipoises at formation temperature.

The total amount of resin-forming ingredients, i.e., resin-forming polyepoxide, amine curing agent and cure modifying compound, is between 20 and 60 percent by volume of the solution, the remainder being hydrocarbon solvent. A preferred concentration range is between 30 and 45 percent.

Once the well has been properly prepared by the process of the present invention, any driving fluids may be used to aid in recovery of the oil and include steam and/or water which may contain surfactants such as ionic, cationic and/or non-ionic surfactants, e.g., sulfonates, polyalkoxy phenols, and the like, as well as hydrocarbons such as lower hydrocarbons and mixtures thereof and/or in situ combustion drives.

The foregoing description of the invention is merely intended to be explanatory thereof. Various changes in the details of the described method may be made, within the scope of the appended claims, without departing from the spirit of the invention.

I claim as my invention:

1. A method for recovering oil from underground formations having a thief zone and a non-productive permeable zone as well as an oil-productive zone traversed by a borehole, comprising:
   forcing through the borehole and into the oil-productive zone a fluid which freezes the oil-productive zone around the borehole and forms a temporary frozen plug;
   forcing through the borehole and into the thief zone and a non-productive permeable zone a plugging agent to permanently plug said zones;
   heating the frozen zone for a time sufficient to effect dissolution of the temporary plug; and,
   recovering oil from the oil-productive zone.

2. A method of claim 1 wherein the freezing is effected by use of Dry Ice and the permanent plugging agent is a polyepoxy resin.

3. A method of claim 1 wherein the freezing is accomplished in and around the liner of the borehole of the oil-productive zone using as the freezing solution ethylene glycol-water mixture and the thief and non-productive permeable zones are permanently plugged with a polyepoxy resin.

4. A method of claim 1 wherein the freezing is accomplished in and around the liner of the borehole of the oil-productive zone using as the freezing solution glycerine-water mixture and the thief and non-productive permeable zones are permanently plugged with a polyepoxy resin.

5. A method of claim 1 wherein the freezing is accomplished in and around the liner of the borehole of the oil-productive zone using brine solution chilled with entrained granular carbon dioxide or by mechanical refrigeration coils and the thief and non-productive permeable zones permanently plugged with a polyepoxy resin.

6. A method for recovering oil from underground formations having a thief zone and an oil-productive zone tranversed by a well borehole, comprising:
   disposing a low-freezing-point fluid in a well borehole adjacent to a permeable earth formation which is not to be plugged but is located behind a permeable conduit that extends along a selected permeable earth formation that is to be plugged;
   removing heat from the low-freezing-point fluid and the adjacent earth formation until the earth formation is temporarily plugged by the freezing of fluid that was contained within its pores;
   continuing the removing of heat until the earth formation to be plugged becomes substantially the only permeable earth formation that is located behind the permeable conduit and is not plugged by the freezing of fluids;
   plugging the earth formation to be plugged by injecting a plug forming fluid and converting it to a plugging material;
   unplugging the temporarily plugged earth formation by melting the material that was frozen within its pores; and,
   recovering oil from the oil-productive zone.

References Cited

UNITED STATES PATENTS

| | | | |
|---|---|---|---|
| 1,342,781 | 6/1920 | Vedder | 166—21 |
| 2,033,561 | 3/1936 | Wells | 166—39 X |
| 2,259,428 | 10/1941 | Shelley | 166—39 |
| 2,792,893 | 5/1957 | Keller | 166—33 |
| 2,801,698 | 8/1957 | Bond | 166—29 X |
| 2,864,448 | 12/1958 | Bond | 166—39 X |
| 3,044,548 | 7/1962 | Perry | 166—33 |
| 3,261,400 | 7/1966 | Elfrink | 166—30 |
| 3,301,326 | 1/1967 | McNamer | 166—29 |
| 3,302,717 | 2/1967 | West | 166—33 |

CHARLES E. O'CONNELL, Primary Examiner.

U.S. Cl. X.R.

166—288, 295